United States Patent Office 3,204,098
Patented Aug. 31, 1965

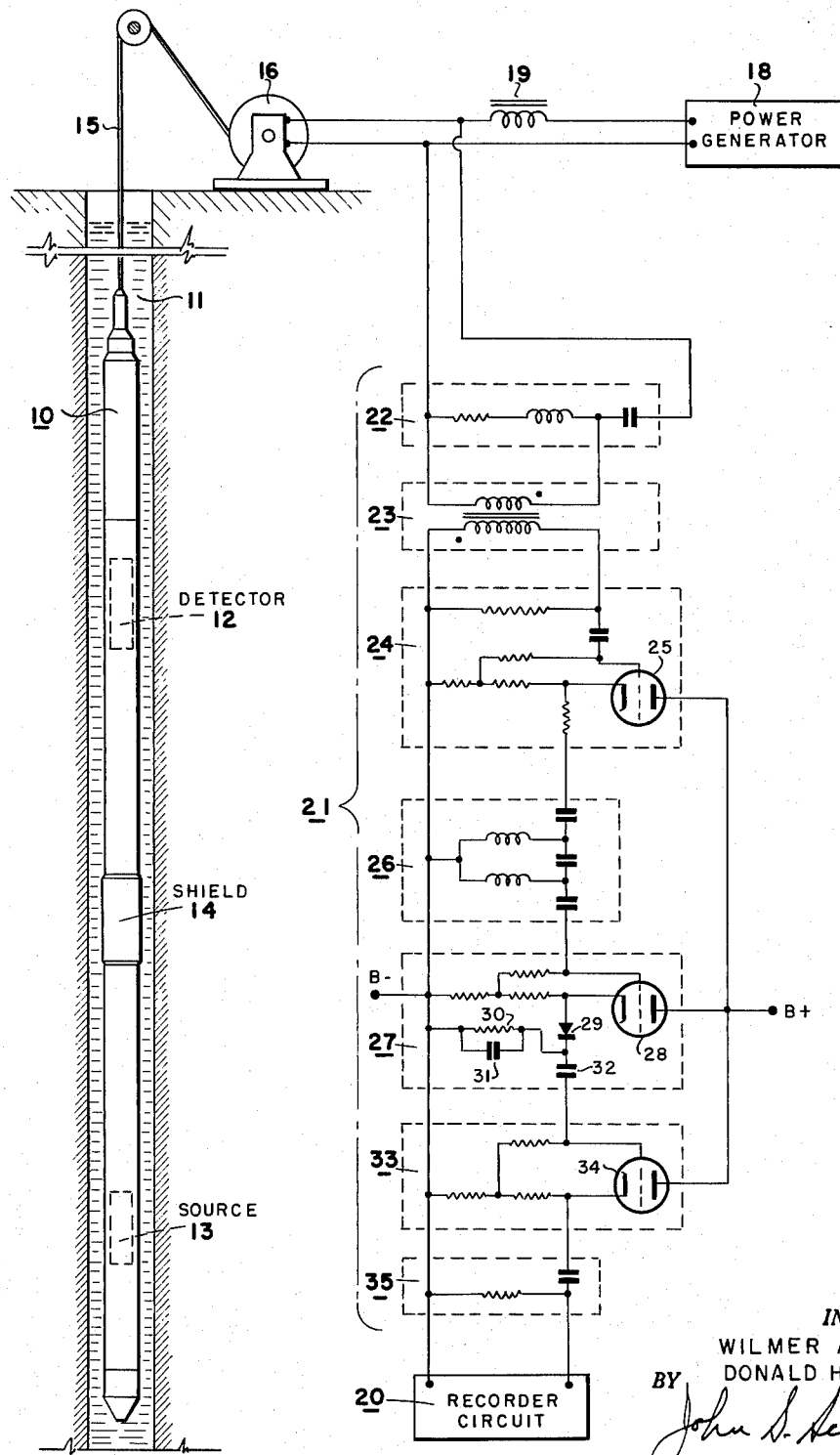

3,204,098
RADIOACTIVE WELL LOGGING SYSTEM WITH SURFACE CIRCUIT DESIGNED TO ISOLATE A.C. POWER SIGNALS FROM LOGGING SIGNALS
Wilmer A. Hoyer and Donald H. Britton, Houston, Tex., assignors, by mesne assignments, to Esso Production Research Company, Houston, Tex., a corporation of Delaware
Filed Dec. 13, 1960, Ser. No. 75,600
6 Claims. (Cl. 250—83.3)

This invention relates to radioactivity well logging apparatus and especially the detector system thereof. More particularly, the invention relates to the surface components of the detector system which are used to record electrical signals representative of detected radiation emanating from subsurface formations.

In radioactivity well logging, characteristics of subsurface formations are investigated by measuring naturally emitted or artificially induced radiation detected in the borehole. The radiation detector tool is suspended in the borehole on an electrical conductor cable which serves to conduct electrical energy from a power generator at the earth's surface to operate the detector (or other apparatus such as a particle accelerator for generating neutrons) and to conduct electrical pulses translated from and representative of the detected radiation to suitable recorder circuits at the earth's surface.

The cable may be a single or multiple-type conductor. In the former, power signals and logging signals share the same pair of signal leads or lines, and it is preferred over the multiple-type conductor, in which the power and logging signals are transmitted over separate pairs of leads, for better transmission is obtained with the single conductor. The single conductor is a coaxial-type cable and for a given space has less capacity and less inductance per unit length, and for equivalent size cables, the single conductor is a larger conductor. The multiple-type conductor is satisfactory for transmitting low frequency signals. However, for transmitting high frequency signals such as those produced by a scintillometer detector, the single-type conductor is better in that distortions are minimized, and more faithful reproduction, low noise, and good resolution are obtained. In both the single conductor system in which the power and logging signals share the same pair of leads and in the multiple conductor system in which the power signal is coupled into the logging signal conductor, the power and logging signals must be separated at the earth's surface in the surface detector system. It is also required that the detector system allow the logging signals resulting from detected radiation to pass into the detector circuits but exclude the power signals therefrom; maintain linearity over a wide dynamic range of signals; modify the input signals from a damp oscillatory wave into a single monopolarized pulse; operate on small signal voltages (up to one volt) in the presence of large (up to 300 volt R.M.S.) A.C. power signals; maintain stability over a wide range of environment temperatures (0 to 100° C.); maintain good signal to noise ratios (40 db. or better); and isolate the down-the-hole grounding system from the surface equipment grounding in order to eliminate ground loop problems.

Techniques that may be used to meet these requirements utilize either:

(a) A passive network consisting of a trap to block the power frequency and a high pass L.C. filter to improve the signal to noise ratio; or
(b) An active network consisting of vacuum tubes, resistors, and capacitors acting as a high pass filter.

The circuit of (a) is disadvantageous in that it increases rather than decreases the damp oscillations accompanying the desired signals, and the circuit of (b) has the disadvantage of relatively high insertion losses, which on small signals multiply the problems of obtaining adequate signal to noise ratios; also, conservative design and other considerations make it undesirable to amplify the signals to overcome the filter insertion losses.

The system of the invention satisfies the above-stated requirements and in addition overcomes the disadvantages in the use of circuits (a) and (b). Briefly, the invention combines both the active and passive networks and comprises a circuit which includes means for isolating the A.C. power source from the logging signal channels; means for separating the power and logging signals; means for isolating the down-the-hole logging tool ground from the surface detector components; and means for obtaining a monopolarized signal output from a bipolarized pulse logging signal input which includes means for maintaining temperature and voltage stability.

Thus, a primary object of the present invention is to provide an improved detector circuit for use in a radioactivity well logging system.

The above object and other objects of the invention will be apparent from the following description of the invention taken in conjunction with the accompanying drawing wherein the sole figure illustrates a radioactivity logging tool suspended in a borehole on a single electrical conductor cable and the surface circuit for use therewith.

Referring to the figure in greater detail, a down-the-hole radioactivity logging sonde 10 is shown suspended in a well bore 11 on a single electrical conductor cable 15. Tool 10 may include a radiation detector 12, e.g., a scintillometer; a source of radiation 13, e.g., a naturally radioactive substance such as polonium-beryllium or an artificially induced radiation source such as a particle accelerator; and a shield of lead or other radiation absorbent material 14 positioned between the source 13 and detector 12 to prevent the radiation emitted by the source from directly impinging upon the detector.

At the surface, cable 15 is reeled on a power-operated drum 16 which is used to raise and lower tool 10 in borehole 11. An alternating current generator and control 18 for supplying controlling the supply of the power requirements of tool 10 is coupled to cable 15 through a ferrite core isolation choke 19, which prevents the logging signals transmitted from detector 12 over cable 15 from entering the power generating and controlling circuits 18. The ferrite core introduces less troublesome harmonics into the power signal than does a conventional iron core reactor. Cable 15 suitably grounded in the well bore also is coupled to a gamma ray spectrum analyzer or other radiation logging signal recorder circuit 20 for recording logging signals transmitted from detector 12 through a circuit 21, which includes a group of filters, chokes, vacuum tubes, resistors, and capacitors designed to provide a stable detector with good signal to noise ratio. Specifically, this circuit couples together a series R.C.L. network 22; an isolation pulse transformer 23; an isolation and impedance transference circuit 24 including vacuum tube 25; a high pass L.C. network 26; a biased diode integrator circuit 27 including vacuum tube 28, diode 29, resistance 30, and capacitors 31 and 32; and output cathode follower circuit 33 including vacuum tube 34; and if desired, differentiation means circuit 35.

The series R.C.L. network 22 terminates cable 15 at the characteristic impedance for the logging signals but at a high impedance to the A.C. power signals. This arrangement provides an easy path to the recorder circuit 20 for the desired logging signals, however, the power signals are blocked. This type network is superior to an L.C. trap filter in that in the R.C.L. network the signal to noise ratio is higher, less signal distortion occurs, and it is less sensitive to changes in the power frequency.

The isolation pulse transformer 23 provides an impedance match from R.C.L. network 22 into the vacuum tube circuits 24, 27, and 33 and isolates the ground of logging tool 10 from the surface components. The high pass L.C. filter network 26 is coupled to the output of transformer 23 through the isolation and impedance transference circuit 24, which provides a high impedance input and a low impedance output to L.C. network 26 which operates in turn as a low insertion loss filter to increase the signal to noise ratio to a desired level. The cathode follower input circuit including vacuum tube 25 and output circuit including vacuum tube 28 of integrator circuit 27 isolates L.C. network 26 from the other circuit elements.

The output of network 26 feeds to the biased diode integrator circuit 27. This circuit operates in the following manner. Silicon diode 29 is biased in the feed direction, since it is connected from the cathode of vacuum tube 28 to ground through resistance 30. Quiescent current through diode 29 determined by resistance 30 is adjusted to a value that insures a linear increase in current when a liner increase in voltage appears at the cathode of vacuum tube 28. Positive pulses developed at the cathode of vacuum tube 28 will increase conduction of current through diode 29, charging capacitor 31 to the peak value of the pulses. The peak charges will be independent of the rise time, decay time, or subsequent overshoot oscillations of the pulses, since the oscillations will be lower in amplitude. Resistor 30 forms a long-time constant discharge path for the charge on capacitor 31. This constant is carefully chosen to fall between two limits; viz., (1) sufficiently long to insure that the voltage on capacitor 31 is higher than the overshoot occurring after the pulse and (2) sufficiently short to completely discharge capacitor 31 to the quiescent voltage prior to arrival of the next pulse. Capacitor 32 couples into the output cathode follower circuit 33 a signal that has a rise time and amplitude equal to the pulse arriving at the input terminals of the biased diode integrator network 27 but rejects the overshoot oscillations contained in these input pulses. The decay time of the output pulse is long compared to the rise time. Thus, the biased diode integrator circuit 27 eliminates the undesirable overshoot added to the logging signals by cable 15 and L.C. filter 26. The output signal from the integrator circuit 27 is a monopolarized pulse, the amplitude of which is independent of rise time, pulse width, and decay time of the input signal to integrator circuit 27. The use of the silicon diode insures stability over a wide range of ambient temperatures. Changes in the vacuum tube cathode D.C. voltages are compensated for by biasing the silicon diode with this voltage. Also, biasing the diode makes the integrator integrate linearly over a wide dynamic range and makes it capable of working on smaller signals.

The output cathode follower circuit 33 isolates integration circuit 27 from changes in load characteristics.

To shorten the integrated output signals supplied to recorder circuit 20, the differentiation circuit 35 may be used. In this circuit the decay time of the integrated pulse is reduced to an optimum value by means of an R.C. time constant.

Having fully described the nature, objects, and operations of our inventions, we claim:

1. In a radioactivity well logging system which includes a down-the-hole radiation detector suspended on an electrical conductor cable the improvement comprising a surface circuit which includes means for obtaining a monopolarized pulse signal output from a bipolarized pulse logging signal input representative of radiation emanating from subsurface formations detected by said detector while maintaining temperature and voltage stability and while preserving the relative amplitude of each pulse signal.

2. In a radioactivity well logging system which includes a down-the-hole radiation detector suspended on an electrical conductor cable the improvement comprising a surface circuit which includes a ferrite core isolation choke means for isolating the A.C. power source used to power the logging apparatus from logging signals representative of radiation emanating from subsurface formations and detected by said detector and for preventing the generation of troublesome power frequency harmonics to preserve the relative amplitude of each pulse logging signal.

3. In a radioactivity well logging system which includes a down-the-hole radiation detector suspended on an electrical conductor cable, the improvement comprising a surface circuit which includes means for isolating the A.C. power source used to power the logging apparatus from logging signals representative of radiation emanating from subsurface formations and detected by said detector coupled to a series R.C.L. network for separating the power and logging signals and to means for isolating the down-the-hole logging tool ground from the surface detector components, said circuit means preserving the relative amplitude of each pulse logging signal.

4. In a radioactivity well logging system which includes a down-the-hole radiation detector suspended on an electrical conductor cable, the improvement comprising a surface circuit which includes means for isolating the A.C. power source used to power the logging apparatus from logging signals representative of radiation emanating from subsurface formations and detected by said detector; a series R.C.L. network for separating the A.C. power and logging signals; means for isolating the down-the-hole logging tool ground from the surface detector components; and means coupled to said separating and isolating means for obtaining a monopolarized pulse logging signal output from a bipolarized pulse logging signal input while maintaining temperature and voltage stability, said circuit means preserving the relative amplitude of each pulse logging signal.

5. In a radioactivity well logging system which includes a down-the-hole radiation detector suspended on an electrical conductor cable, a surface circuit comprising means for isolating the A.C. power source to power the logging apparatus from logging signals representative of detected radiation; a series R.C.L. network for separating the power and logging signals; an isolation and impedance transference means to provide a high impedance input and a low impedance output coupled to said R.C.L. network through an isolation pulse transformer which provides an impedance match from said R.C.L. network into said isolation and impedance transference means and also isolates the ground of the logging tool from the circuit components; a low insertion loss filter means to increase the signal to noise ratio coupling said isolation and impedance transference means to a biased diode integrator circuit; said integrator circuit converting bipolarized input pulses to monopolarized output pulses while maintaining temperature and voltage stability; and a recorder circuit coupled to said integrator circuit.

6. In a radioactivity well logging system which includes a down-the-hole radiation detector suspended on an electrical conductor cable, a surface circuit comprising means for isolating the A.C. power source used to power the logging apparatus from logging signals representative of detected radiation; a series R.C.L. network for separating the power and logging signals; an isolation and impedance transference means to provide a high impedance input and a low impedance output coupled to said R.C.L. network through an isolation pulse transformer which provides an impedance match from said R.C.L. network into said isolation and impedance transference means and also isolates the ground of the logging tool from the circuit components; a low insertion loss filter means to increase the signal to noise ratio coupling said isolation and impedance transference means to a biased diode integrator circuit; said integrator circuit converting bipolarized input pulses to monopolarized output pulses while maintaining temperature stability and insensitivity to input power supply voltage changes; and a recorder circuit coupled to said integrator circuit through an output cathode follower circuit which isolates said integrator circuit from changes in load characteristics and a differentiation circuit which shortens the integrated signals.

References Cited by the Examiner

UNITED STATES PATENTS

| | | | |
|---|---|---|---|
| 2,368,532 | 1/45 | Fearon | 250—83.6 |
| 2,381,904 | 8/45 | Hare | 250—83.6 |
| 2,436,563 | 2/48 | Frosch | 250—83.6 |
| 2,674,699 | 4/54 | Phillips | 250—83.6 |
| 2,824,238 | 2/58 | Stellmacher | 250—83.6 |
| 2,824,973 | 2/58 | Gundlach et al. | 250—83.6 |
| 2,899,561 | 8/59 | White | 250—83.3 |
| 2,909,663 | 10/59 | McFarlane et al. | 250—83.3 |
| 2,920,208 | 1/60 | Crump | 250—83.6 |
| 2,938,123 | 5/60 | Constable | 250—83.3 |
| 3,052,798 | 9/62 | Firminhac | 250—83.6 |

RALPH G. NILSON, *Primary Examiner.*

ARTHUR GAUSS, *Examiner.*